United States Patent
Zheng et al.

(10) Patent No.: US 11,262,609 B2
(45) Date of Patent: Mar. 1, 2022

(54) PLASTIC FRAME, BACKLIGHT MODULE AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Hui Zheng, Beijing (CN); Hanyan Sun, Beijing (CN); Xiaojian Yang, Beijing (CN); Minghui Zhang, Beijing (CN); Inho Park, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/842,914

(22) Filed: Apr. 8, 2020

(65) Prior Publication Data

US 2021/0116738 A1   Apr. 22, 2021

(30) Foreign Application Priority Data

Oct. 21, 2019   (CN) .......................... 201921773142.6

(51) Int. Cl.
   *G02F 1/1333*   (2006.01)

(52) U.S. Cl.
   CPC .. *G02F 1/133308* (2013.01); *G02F 1/133317* (2021.01)

(58) Field of Classification Search
   CPC .................................................. G02F 1/133308
   See application file for complete search history.

(56) References Cited

U.S. PATENT DOCUMENTS

| | | | |
|---|---|---|---|
| 2017/0146850 A1* | 5/2017 | Lee | H05K 999/99 |
| 2017/0205571 A1* | 7/2017 | Kim | G02B 6/0088 |

* cited by examiner

*Primary Examiner* — Edmond C Lau
(74) *Attorney, Agent, or Firm* — Thomas | Horstemeyer, LLP

(57) ABSTRACT

A plastic frame includes a first frame having a first frame surface and a first end portion and a second end portion opposite to each other, and a second frame having a second frame surface, an end portion of the second frame being connected to the first end portion of the first frame. The first frame surface and the second frame surface are located on the same side of the plastic frame. A first height difference between the first frame surface at a first end portion of the first frame and the second frame surface is smaller than a height difference between the first frame surface at a middle portion of the first frame and the second frame surface. The first height difference may be, for example, 0.1-0.3 mm.

18 Claims, 4 Drawing Sheets

PLASTIC FRAME, BACKLIGHT MODULE AND DISPLAY DEVICE

CROSS-REFERENCE TO RELATED APPLICATION

This application claims the benefit of and priority to Chinese Patent Application No. 201921773142.6, filed on Oct. 21, 2019, the contents of which being incorporated by reference in their entirety herein.

TECHNICAL FIELD

This disclosure relates to the technical field of liquid crystal display devices and, in particular, to a plastic frame, a backlight module, and a display device.

BACKGROUND

When liquid crystal modules are designed, generally, the liquid crystal display panel includes a color film substrate and an array substrate which are attached to each other. For three-sided edgeless liquid crystal modules, presently, chip-on-flex (COF), generally referred to as a flip-chip film, or chip-on-glass (COG), i.e., a chip directly bonded to a glass substrate, technology is generally adopted to bond a circuit board (bonding printed circuit board (PCB)) at a bonding part (i.e., a pad part) of the array substrate.

SUMMARY

According to one aspect of the present disclosure, a plastic frame includes:
    a first frame having a first frame surface and a first end portion and a second end portion opposite to each other; and
    a second frame having a second frame surface, an end portion of the second frame being connected to the first end portion of the first frame;
    wherein the first frame surface and the second frame surface are located on the same side of the plastic frame; and a first height difference between the first frame surface at a first end portion of the first frame and the second frame surface is smaller than a height difference between the first frame surface at a middle portion of the first frame and the second frame surface.
    wherein the first height difference is 0.1-0.3 mm.
    According to one embodiment of the present disclosure, the plastic frame further includes:
    a third frame having a third frame surface, an end portion of the third frame being connected to the second end portion of the first frame;
    wherein the third frame surface and the first frame surface are located on the same side of the plastic frame, and a second height difference between the first frame surface at a second end portion of the first frame and the third frame surface is smaller than a height difference between the first frame surface at the middle portion of the first frame and the third frame surface.
    According to one embodiment of the present disclosure, wherein the second height difference is 0.1-0.3 mm.
    According to one embodiment of the present disclosure, wherein the first frame surface includes:
    a middle plane located in the middle of the first frame surface;
    a first inclined surface connected to the middle plane and extending to the first end portion; and
    a second inclined surface connected to the middle plane and extending to the second end portion.
    According to one embodiment of the present disclosure, wherein an inclination angle of the first inclined surface with respect to the middle plane is 5°-10°; or/and the inclination angle of the second inclined surface with respect to the middle plane is 5°-10°.
    According to one embodiment of the present disclosure, wherein a height of the first inclined surface at the first end portion is greater than a height of the second frame surface; or/and a height of the second inclined surface at the second end portion is greater than a height of the third frame surface.
    According to one embodiment of the present disclosure, wherein a length of the first inclined surface in a longitudinal direction of the first frame surface is 10-20 mm; or/and a length of the second inclined surface in the longitudinal direction of the first frame surface is 10-20 mm.
    According to one embodiment of the present disclosure, wherein the first inclined surface is smoothly connected to the middle plane, and/or the second inclined surface is smoothly connected to the middle plane.
    According to the other aspect of the present disclosure, a backlight module includes the plastic frame according to the present disclosure.
    According to a further aspect of the present disclosure, a display device includes:
    a plastic frame, including:
    a first frame having a first frame surface and a first end portion and a second end portion opposite to each other; and
    a second frame having a second frame surface, an end portion of the second frame being connected to the first end portion of the first frame;
    wherein the first frame surface and the second frame surface are located on the same side of the plastic frame, and a first height difference between the first frame surface at a first end portion of the first frame and the second frame surface is smaller than a height difference between the first frame surface at a middle portion of the first frame and the second frame surface; and
    a display panel supported on the first frame surface and the second frame surface, wherein a side of the display panel has a bonding part for bonding and connecting to a circuit board, and at least a part of the bonding part is supported on the first frame surface.

BRIEF DESCRIPTION OF THE DRAWINGS

The accompanying drawings, which are included to provide a further understanding of the technical solution of the present disclosure and constitute a part of the specification, together with the embodiments of the present disclosure serve to explain the technical solution of the present disclosure, without limiting to the technical solution of the present disclosure.

DETAILED DESCRIPTION

The technical solution of the present disclosure will be further described below with reference to the accompanying drawings and through specific embodiments. It is appreciated that the specific embodiments as described herein are merely used to explain the present disclosure rather than limiting the present disclosure.

Figure 1:
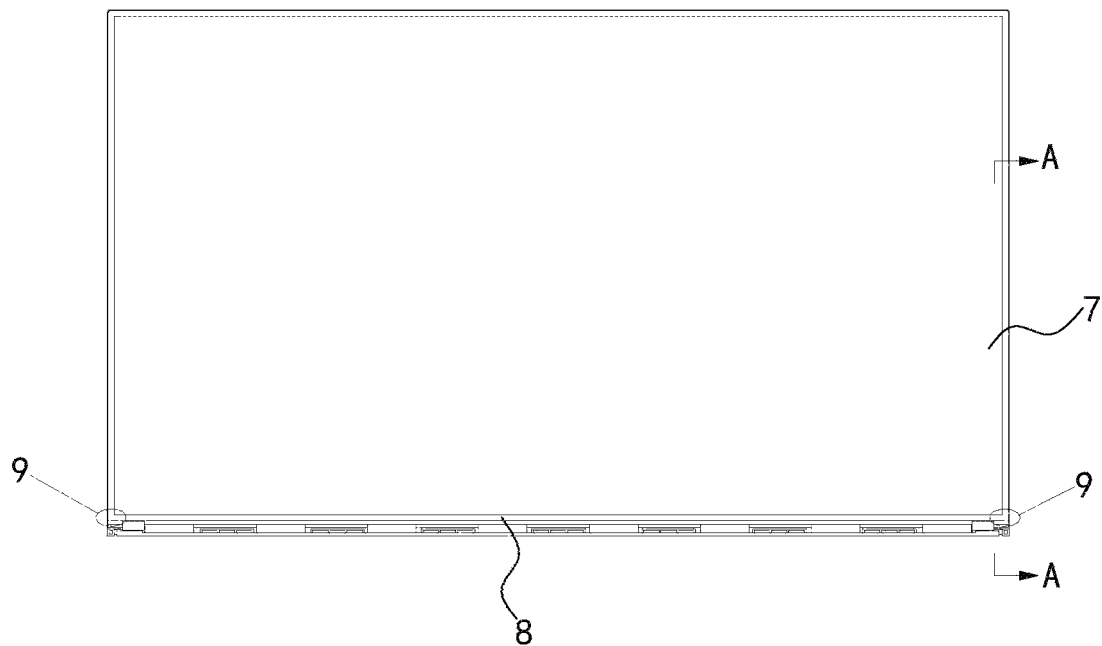
FIG. 1 is a schematic structural view of a display device of the related art.
Figure 2:
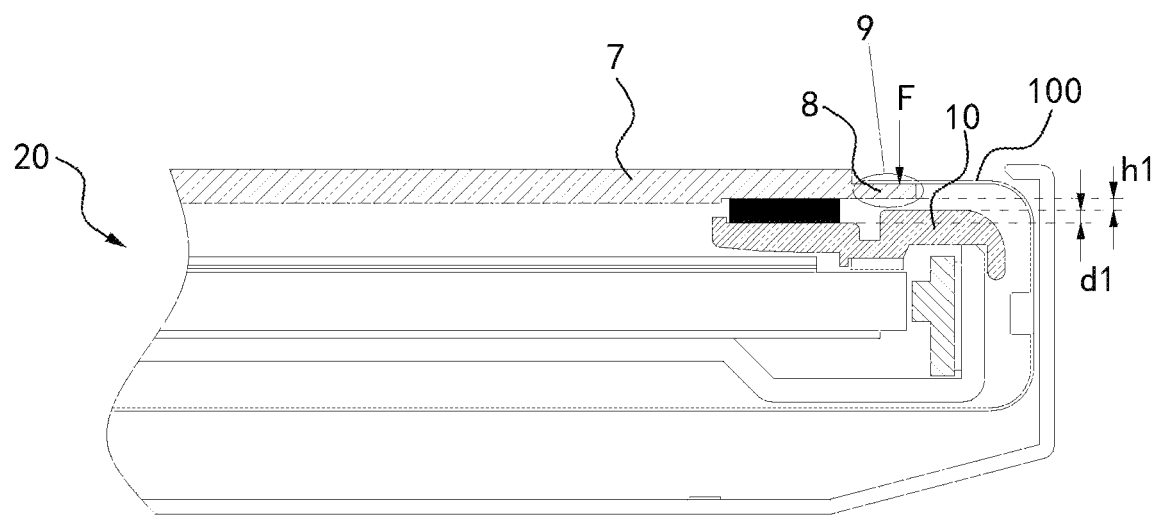
FIG. 2 is a sectional view taken along a line A-A in FIG. 1.

With reference to FIG. 1 and FIG. 2, FIG. 1 is a schematic structural view of a display device of the related art, showing a corner breakage position which easily occurs at a side where a bonding part is located. FIG. 2 is a sectional view taken along a line A-A in FIG. 1.

As shown in FIGS. 1 and 2, the display device mainly includes a plastic frame, a display panel 7 supported on a front of the plastic frame, and a backlight module 20 provided on a back of the plastic frame. One side of the display panel 7 is provided with a bonding part 8 (i.e., a pad part) for bonding with a circuit board 100. The bonding part 8 is a single-layer glass substrate structure and has a thickness thinner than other positions of the display panel, as such, corner breakage easily occurs on the display panel during assembly or application of the display device.

The plastic frame a height difference d1 (see FIG. 2) between an end portion surface thereof below the bonding part 8 and a surface thereof below the display panel 7. That is, the plastic frame has a larger broken difference structure (i.e., an uneven structure).

According to analysis of force being applied to the corner breakage position 9 of the display panel 7, it is found that when the liquid crystal module in the display device is assembled, left and right corner positions on a side of an external circuit board 11 (PCB, i.e., the circuit board) of the display panel 7 need to be pasted with a conductive cloth. During the pasting process, a force will be applied to the display panel 7. If a surface supporting the display panel 7 is uneven, stress concentration will easily occur to cause corner breakage. As the corner is uneven, corner breakage tends to occur due to stress concentration. A breakage position 9 is referenced in FIGS. 1 and 2. As shown in FIG. 2, in the actual assembly process, the plastic frame 10 of the backlight module 20 provides support for the display panel 7. When the display panel 7 is subjected to external pressure F, due to the segment difference structure on the plastic frame 10, fragmentation will easily occur. As compared with the middle portion, the corner position stress concentration is more prone to occur, thereby causing corner breakage.

Figure 3A:
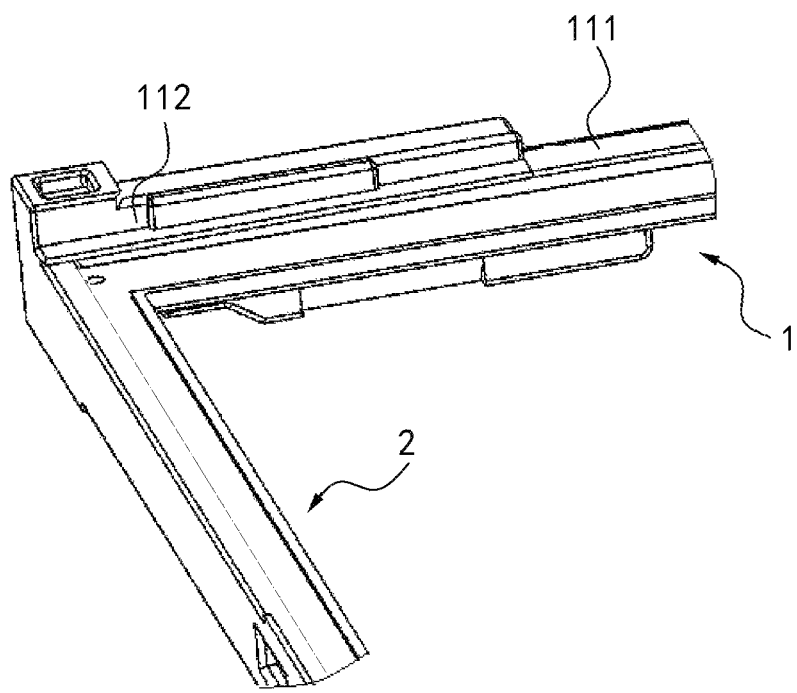
FIG. 3A is a partial schematic structural view of a plastic frame according to an embodiment of the present disclosure.
Figure 3B:
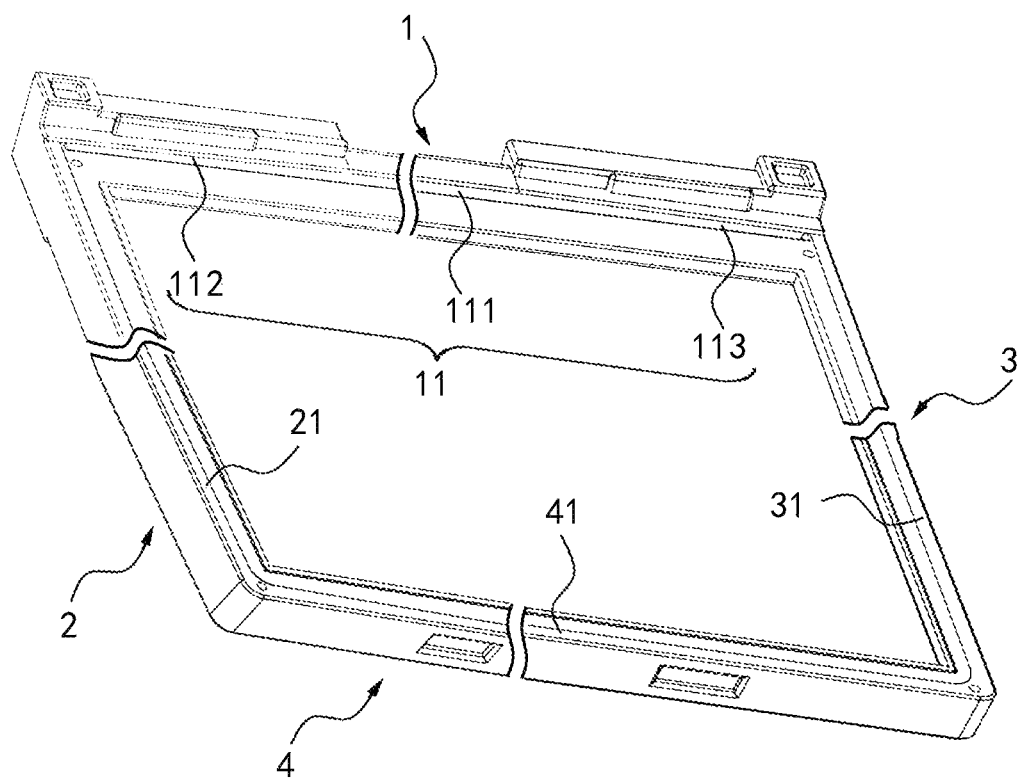
FIG. 3B is an overall schematic structural view of a plastic frame according to an embodiment of the present disclosure.
Figure 4:
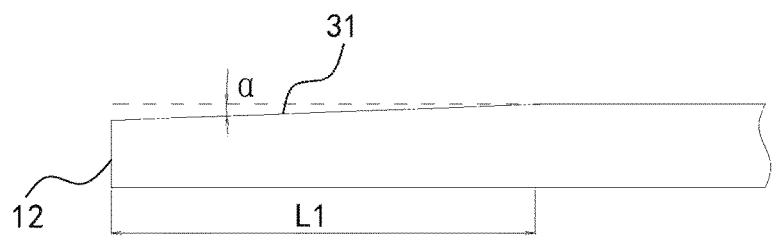
FIG. 4 is a partial schematic structural view of a first frame of the plastic frame according to an embodiment of the present disclosure.

Now, with reference to FIG. 3A, FIG. 3B, and FIG. 4, FIG. 3A is a partial schematic structural view of a plastic frame according to an embodiment of the present disclosure. FIG. 3B is an overall schematic structural view of a plastic frame according to an embodiment of the present disclosure. FIG. 4 is a sectional view taken along a line A-A in FIG. 3A.

The plastic frame of an embodiment of the present disclosure has a rectangular frame structure, and includes a first frame 1, a second frame 2, a fourth frame 4, and a third frame 3, which are sequentially connected end to end.

The first frame 1 has a first frame surface 11 and first and second end portions 12 and 13 opposite to each other. The second frame 2 has a second frame surface 21, and an end portion of the second frame 2 is connected to the first end portion 12 of the first frame 1. The third frame 3 has a third frame surface 31, and an end portion of the third frame 3 is connected to the second end portion 13 of the first frame 1. The fourth frame 4 has a fourth frame surface 41 connected between the second frame 2 and the third frame 3.

The first frame surface 11, the second frame surface 21, the third frame surface 31, and the fourth frame surface 41 are located on the same side of the plastic frame, for example, on an upper surface of the plastic frame. A first height difference d2 (see FIG. 6) between the first frame surface 11 at the first end portion 12 of the first frame 1 and the second frame surface 21 is smaller than a height difference between the first frame surface 11 at the middle portion of the first frame 1 and the second frame surface 21 (the height difference may referred to d1 in FIG. 2). In this embodiment, the first height difference d2 is 0.2 mm. In some embodiments, the first height difference d2 may be in a range of 0.1-0.3 mm, and in other embodiments, the first height difference d2 may also be 0.

Similarly, a second height difference between the first frame surface 11 at the second end portion 13 of the first frame 1 and the third frame surface 112 is smaller than a height difference between the first frame surface 11 at the middle portion of the first frame 1 and the third frame surface 112. In this embodiment, the second height difference is 0.2 mm. In other embodiments, the second height difference is in a range of 0.1-0.3 mm, or may be 0.

Formation of the first height difference d2 and the second height difference will be described below with the first frame surface 11, as an example.

The first frame surface 11 includes a middle plane 111 located in the middle of the first frame surface 11, and a first inclined surface 112 and a second inclined surface 113 smoothly connect to two end portions of the middle plane 111. The first inclined surface 112 extends from the middle plane 111 to the first end portion 12, and the second inclined surface 113 extends from the middle plane 111 to the second end portion 13.

An inclination angle α of the first inclined surface 112 with respect to the middle plane 111 is 6°. In some embodiments, the inclination angle α is feasible in the range of 5°-10°. An inclination angle β of the second inclined surface 113 with respect to the middle plane 111 is 6°. In other embodiments, the inclination angle β is feasible in the range of 5°-10°. The inclination angle α and the inclination angle β may be the same or different.

A height of the first inclined surface 112 at the first end portion 12 is greater than a height of the second frame surface 21, that is, the first inclined surface 112 at the lowest end is still higher than the second frame surface 21. In some embodiments, the first inclined surface 112 and the second frame surface 21 also may be flush. A height of the second inclined surface 113 at the second end portion 13 is greater than a height of the third frame surface 112, that is, the second inclined surface 113 at the lowest end is still higher than the third frame surface 112. In some embodiments, the second inclined surface 113 and the third frame surface 112 are flush.

A length L1 of the first inclined surface 112 in a longitudinal direction D of the first frame surface 11, that is, a distance from a starting position P1 where the first inclined surface 112 is connected to the middle plane 111 to the first end portion 12 of the first frame surface 11 is 15 mm, and the length L1 may be feasible in the range of 10-20 mm. A length L2 of the second inclined surface 113 in the longitudinal direction D of the first frame surface 11, that is, a distance from the starting position P2 where the second inclined surface 113 is connected to the middle plane 111 to the second end portion 13 of the first frame surface 11 is 15 mm, and the length L1 may be feasible in the range of 10-20 mm. The length L1 of the first inclined surface 112 and the length L2 of the second inclined surface 113 may be same or different.

A specific way of forming an inclined surface on portions of the first frame surface 11 close to the first end portion 12 and close to the second end portion 13 respectively, and thereby forming smaller first height difference and second height difference is described above. However, the present disclosure is not limited to the above-described specific embodiments. For example, in some embodiments, a plurality of stage surfaces may be formed on the portions of the first frame surface 11 close to the first end portion 12 and close to the second end portion 13, respectively, and a smaller first height difference and second height difference may also be formed.

A backlight module 20 provided by the present disclosure includes the plastic frame 10 of the present disclosure.

Figure 6:
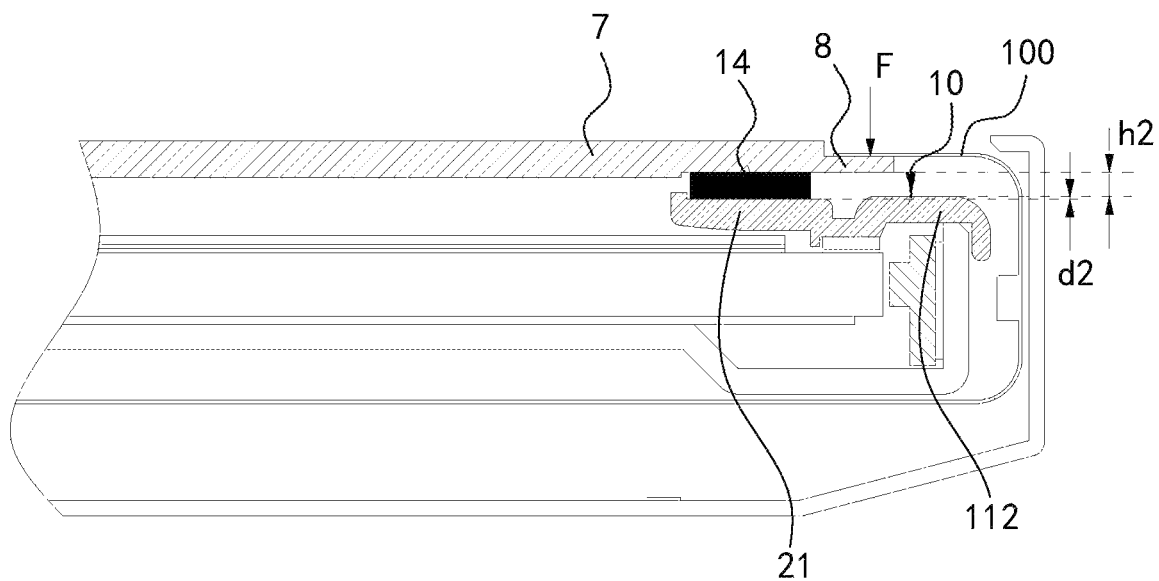
FIG. 6 is a schematic structural view of a display device according to an embodiment of the present disclosure.

As shown in FIG. 6, an embodiment of the present disclosure provides a display device including a display panel 7 and a backlight module 20 disposed on a back side of the display panel 7. The display panel 7 has a bonding part 8 for bonding and connecting to a circuit board 100. The backlight module 20 includes a plastic frame 10 supported on a peripheral area on the back side of the display panel 7. The plastic frame 10 is provided with a first frame surface 11 facing the display panel 7 and a second frame surface 21 adjacent to the first frame surface 11. The bonding part 8 is supported on the first frame surface 11. A first height difference between an end portion of the first frame surface 11 that is connected to the second frame surface 21 and the second frame surface 21 is smaller than a height difference between the middle portion of the first frame surface 11 and the second frame surface 21 (referring to d1 in FIG. 1).

In the display device of this embodiment, the height difference between the first frame surface 11 and the second frame surface 21 of the plastic frame 10 is determined by the injection molding process of the plastic frame 10. The requirement for the injection molding of the plastic frame 10 is that, in order to ensure stability of the injection molding structure, it is required to steal a material from a position where the material is thicker. Stealing the material will result in forming a groove structure on the surface, and the material of the plastic frame 10 cannot be too thin. In order to solve the corner breakage of the bonding part 8 of the display panel 7 caused by a surface segment difference structure formed by the injection molding process of the plastic frame 10, the first height difference between the end portion of the first frame surface 11 connected to the second frame surface 21 and the second frame surface 21 is configured to be smaller than the height difference between the middle portion of the first frame surface 11 and the second frame surface 21, and the first frame surface 11 below the bonding part 8 of the display panel 7 is relatively flat so that it is not easy to produce fragments. In addition, since the first height difference between the first frame surface 11 at the first end portion and the second frame surface 21 is reduced, a gap h2 (see FIG. 6) between the lower surface of the bonding part 8 of the display panel 7 and the first frame surface 11 of the first frame is increased relative to a h1 (see FIG. 1) of the conventional design. That is, a distance between a turning corner position (i.e., the corner breakage position 9) of the side at which the bonding part 8 of the display panel 7 is located and the second frame surface 21 increases, such that the turning corner position (i.e., the corner breakage position 9) of the side at which the bonding part 8 of the display panel 7 is located cannot be in contact with the plastic frame 10, thereby not causing corner breakage.

As shown in FIGS. 3A and 3B, in this embodiment, the material of the plastic frame 10 may be plastic, and the plastic frame 10 may include four frames supported on a peripheral area on the back side of the display panel 7, and the four frames enclose a rectangular frame. The four frames include a first frame 1, a second frame 2, and a third frame 3 adjacent to the first frame 1, as well as a fourth frame 4 opposite to the first frame 1. Each of the frames is provided with a frame surface facing the display panel 7 and supporting the display panel 7 along a length direction. The frame surface includes a first frame surface 11 of the first frame 1, a second frame surface 21 of the second frame 2, and a third frame surface 112 of the third frame 3. Both end portions of the first frame surface 11 are adjacent to the second frame surface 21 and the third frame surface 31, respectively.

In order to avoid corner breakage occurring on the left and right corners of the bonding part 8 of the display panel 7, the second height difference (referring to the first height difference d2) between the end portion of the first frame surface 11 connected to the third frame surface and the third frame surface is smaller than the height difference (referring to d1 in FIG. 1) between the middle portion of the first frame surface 11 and the third frame surface.

As shown in FIG. 6, FIG. 6 is a schematic structural view of a display device according to an embodiment of the present disclosure corresponding to a sectional view at A-A position in FIG. 1. As an example, in order to satisfy for the above-mentioned height difference, as shown in FIGS. 3A and 4, an end portion of the first frame surface 11 in contact with the second frame surface 21 is provided as a first inclined surface 112, and a lower end portion of the first inclined surface 112 is in contact with the second frame surface 21; and/or, the end portion of the first frame surface 11 in contact with the third frame surface 31 is provided as a second inclined surface 113, and a lower end portion of the second inclined surface 113 is in contact with the third frame surface. In another embodiment, in order to satisfy for the above-mentioned height difference, the end portion region of the first frame surface 11 in contact with the second frame surface 21 may be configured to be a plane having a height lower than the middle portion of the first frame surface 11, and a step may be formed between the lower plane and the middle portion of the first frame surface 11. Similarly, the end portion region of the first frame surface 11 in contact with the third frame surface may be configured to be a plane having a height lower than the middle portion of the first frame surface 11, and a step may be formed between the lower plane and the middle portion of the first frame surface 11.

Figure 5:
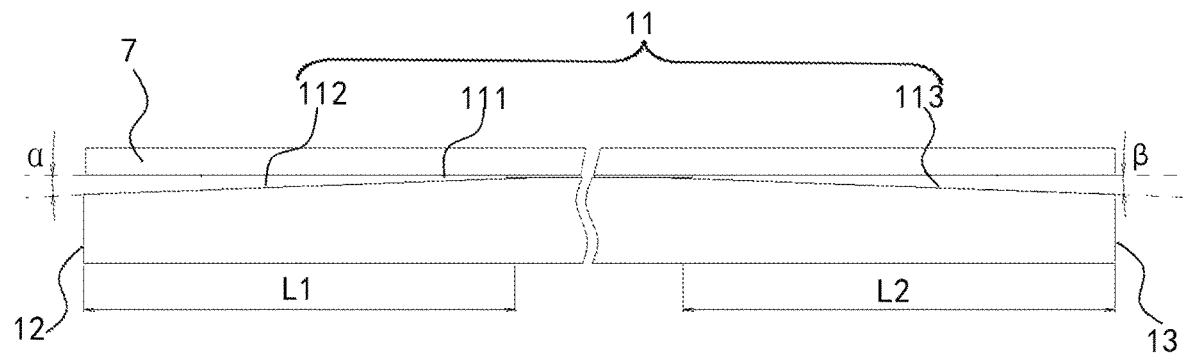
FIG. 5 is an overall schematic structural view of a first frame of the plastic frame according to an embodiment of the present disclosure.

As shown in FIG. 5, in this embodiment, a portion of the first frame surface 11 close to both end portions thereof may be provided as an inclined surface, such as the first inclined surface 112 and the second inclined surface 113. As such, the left and right corner positions of the display panel 7 cannot contact the plastic frame 10 when the display panel 7 is pressed by an external force, so that the corner breakage will not occur on the left and right corners.

As shown in FIG. 6, in this embodiment, the first inclined surface 112 is illustrated as an example. Due to arrangement of the structure of the first inclined surface 112, the height difference between the end portion of the first frame surface 11 in contact with the second frame surface 21 and the second frame surface 21 is reduced (the height difference is d1 in the related art shown in FIG. 2, d2<d1 in the present disclosure), such that a supporting surface of the plastic frame 10 corresponding to the corner breakage position of the display panel 7 becomes even. The height of the plastic frame 10 at a corner position on the side at which the bonding part 8 of the display panel 7 is located (i.e., the corner breakage position of the display panel 7) is also reduced, such that a gap distance between the supporting surface of the plastic frame 10 and the corner breakage position of the display panel 7 is increased (the gap distance between the corner breakage position of the display panel 7 and the plastic frame 10 is h1 in the related art shown in FIG. 2, and the gap is h2 in the embodiment shown in FIG. 6, because of the arrangement of the first inclined surface 112 in this embodiment, h2>h1) so that the corner breakage position of the display panel 7 will not contact the plastic frame 10 when the display panel 7 is pressed by the external force F. This greatly reduces the stress concentration when the display panel 7 is forced and corner breakage is not prone to occur. Furthermore, the above-mentioned structures of the first inclined surface 112 and the second inclined surface 113 are easily formed in the injection molding process of the plastic frame 10.

In addition, as compared to the plastic frame of the related structure, the plastic frame 10 in this embodiment does not increase cost, and an appearance of the display module has no obvious change in practical application. Among the display device with the conventional plastic frame structure, the products with the corner breakage can only be treated as defective products (NG products) and cannot be repaired. After actual verification, the display device adopting the plastic frame 10 with the above structure of this embodiment can greatly reduce the corner breakage phenomenon and improve the delivery yield of various products.

As shown in FIG. 5, the inclination angle, length, height, and other parameters of the first inclined surface 112 and the second inclined surface 113 may be the same or different.

Regarding the design of the first inclined surface 112 and the second inclined surface 113, the first inclined surface 112 will be illustrated as an example, as shown in FIG. 6, in order to prevent the gap h2 between the display panel 7 and the supporting surface of the plastic frame 10 from being too large (a gap being too large easily lets foreign matter in to affect picture quality). As shown in FIG. 4, the inclination angle α of the first inclined surface 112 may be 5°-10°, and the length L1 of the first inclined surface 112 in the longitudinal direction of the first frame surface 11 may be 10-20 mm. The inclination angle α, and the length L1 may be adjusted within the above range depending on a model of the display module.

As shown in FIGS. 6 and 3A, in this embodiment, the height of the first inclined surface 112 may be greater than the height of the second frame surface 21; and/or the height of the second inclined surface 113 may be greater than the height of the third frame surface. There is a gap between the bonding part 8 and the first inclined surface 112. Similarly, there is a gap between the bonding part 8 and the second inclined surface 113. The height difference between the end portion of the first frame surface 11 adjacent to the second frame surface 21 and the second frame surface 21 is reduced by providing the first inclined surface 112, and the height difference between the end portion of the first frame surface 11 adjacent to the third frame surface and the third frame surface is reduced by providing the second inclined surface 113 to reduce the height of the supporting surface of the plastic frame 10 corresponding to the corner breakage position of the display panel 7, increase the gap, and improve the poor corner breakage phenomenon of the display panel 7.

The height difference d2 between the lower end portion of the first inclined surface 112 and the second frame surface 21 may be 0.1-0.3 mm, which is set to be 0.2 mm in this embodiment. Similarly, the height difference between the lower end portion of the second inclined surface 113 and the third frame surface may be 0.1-0.3 mm, which is set to be 0.2 mm in this embodiment. Through practical application, it is found that the above-mentioned height difference range corner breakage is not prone to occur or too large of a gap is avoided.

As shown in FIG. 5, the middle portion of the first frame surface 11 may be provided as a middle plane 111 smoothly contacting with the first inclined surface 112 or/and the second inclined surface 113. A rounded corner polishing can be performed at a connection between the middle plane 111 and the first inclined surface 112 or/and the second inclined surface 113 to define a smooth transition and prevent stress concentration points from forming at the transition position.

Figure 7:
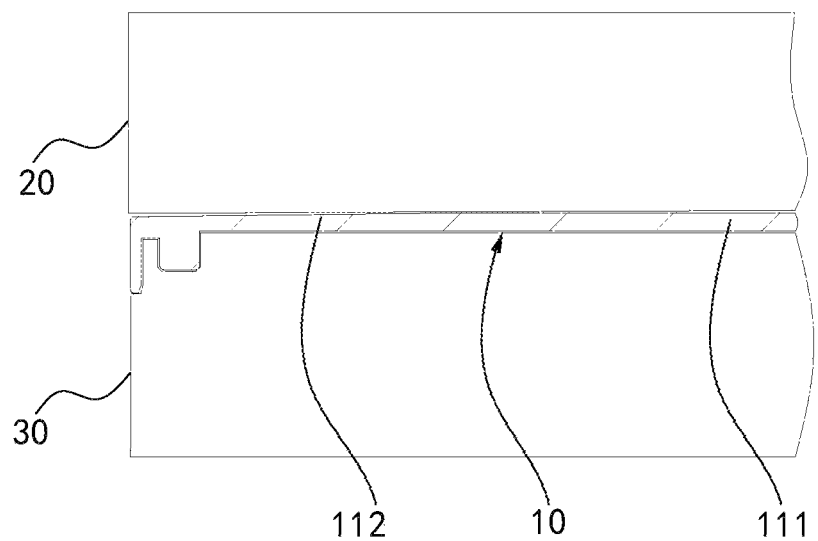
FIG. 7 is a schematic structural view of a male mold and a female mold during injection molding of the plastic frame according to an embodiment of the present disclosure.

The plastic frame 10 may be an integrated injection molding structure. As shown in FIG. 7, in the injection molding process, the plastic frame 10 is formed by a male mold 20 and a female mold 30 which are matched with each other. The plastic frame 10 having the first inclined surface 112 and the second inclined surface 113 can be formed merely by adding materials of the corresponding structure at the position of the male mold 20 or the female mold 30 corresponding to the corresponding inclined surface (i.e., the corresponding position of the mold is provided as the corresponding inclined surface), and performing R-angle polishing treatment (surface burr prevention) on the added materials surface.

As shown in FIG. 6, a buffer 14 may be provided between the plastic frame 10 and the back side of the display panel 7. The buffer 14 keeps away from the bonding part 8, that is, an orthographic projection of the buffer 14 on the display panel 7 is not overlapped with the bonding part 8. The buffer 14 may be made of elastic materials, such as foam or the like. When the display panel 7 is subjected to an external force, the buffer 14 elastically deforms, which can play a role in buffering, damping, and protecting the display panel 7.

In the description of embodiments of the present disclosure, the terms "connect," "fixedly connect," "install," and "assemble" shall be broadly understood, unless otherwise explicitly specified and defined, for example, may include a fixed connection, a detachable connection or an integral connection. The terms "installation," "connection," and "fixed connection" may refer to a direct connection, indirect connection through an intermediate media, or internal communication between two elements. For those of ordinary skill in the art, the specific meanings of the above terms in the embodiments of the present disclosure can be understood depending on specific context.

What is claimed is:
1. A plastic frame, comprising:
a first frame having a first frame surface, and a first end portion and a second end portion opposite to each other; and a second frame having a second frame surface, an end portion of the second frame being connected to the first end portion of the first frame, wherein:

the first frame surface and the second frame surface are located on a same side of the plastic frame, and a first height difference between the first frame surface at the first end portion of the first frame and the second frame surface is smaller than a height difference between the first frame surface at a middle portion of the first frame and the second frame surface;

the first frame surface further comprises:
 a middle plane in the middle of the first frame surface;
 a first inclined surface connected to the middle plane and extending to the first end portion; and
 a second inclined surface connected to the middle plane and extending to the second end portion; and a length of the first inclined surface in a longitudinal direction of the first frame surface is larger than a length of the middle plane, and a length of the second inclined surface in a longitudinal direction of the first frame surface is larger than the length of the middle plane.

2. The plastic frame according to claim 1, wherein the first height difference is 0.1-0.3 mm.

3. The plastic frame according to claim 1, further comprising:
a third frame having a third frame surface, an end portion of the third frame being connected to the second end portion of the first frame;
wherein the third frame surface and the first frame surface are located on the same side of the plastic frame, and a second height difference between the first frame surface at the second end portion of the first frame and the third frame surface is smaller than a height difference between the first frame surface at the middle portion of the first frame and the third frame surface.

4. The plastic frame according to claim 3, wherein the second height difference is 0.1-0.3 mm.

5. The plastic frame according to claim 1, wherein: an inclination angle of the first inclined surface with respect to the middle plane is 5°-10°; or the inclination angle of the second inclined surface with respect to the middle plane is 5°-10°.

6. The plastic frame of claim 5, wherein:
a height of the first inclined surface at the first end portion is greater than a height of the second frame surface; or
a height of the second inclined surface at the second end portion is greater than a height of the third frame surface.

7. The plastic frame according to claim 1, wherein: the length of the first inclined surface is 10-20 mm; or the length of the second inclined surface is 10-20 mm.

8. The plastic frame of claim 1, wherein the first inclined surface is smoothly connected to the middle plane, or the second inclined surface is smoothly connected to the middle plane.

9. A backlight module, comprising:
a plastic frame, comprising:
 a first frame having a first frame surface, and a first end portion and a second end portion opposite to each other; and
 a second frame having a second frame surface, an end portion of the second frame being connected to the first end portion of the first frame, wherein:
 the first frame surface and the second frame surface are located on a same side of the plastic frame, and a first height difference between the first frame surface at the first end portion of the first frame and the second frame surface is smaller than a height difference between the first frame surface at a middle portion of the first frame and the second frame surface;
 the first frame surface further comprises:
  a middle plane in the middle of the first frame surface;
  a first inclined surface connected to the middle plane and extending to the first end portion; and
  a second inclined surface connected to the middle plane and extending to the second end portion; and
 a length of the first inclined surface in a longitudinal direction of the first frame surface is larger than a length of the middle plane, and a length of the second inclined surface in a longitudinal direction of the first frame surface is larger than the length of the middle plane.

10. A display device, comprising:
a plastic frame, comprising:
 a first frame having a first frame surface and a first end portion and a second end portion opposite to each other; and
 a second frame having a second frame surface, an end portion of the second frame being connected to the first end portion of the first frame;
 wherein the first frame surface and the second frame surface are located on the same side of the plastic frame, and a first height difference between the first frame surface at the first end portion of the first frame and the second frame surface is smaller than a height difference between the first frame surface at a middle portion of the first frame and the second frame surface; and
a display panel supported on the first frame surface and the second frame surface, wherein:
a side of the display panel has a bonding part for bonding and connecting to a circuit board, and at least a part of the bonding part is supported on the first frame surface;
a distance between the first end portion of the first frame and the display panel is larger than a distance between the display panel and the first frame surface at a middle portion of the first frame;
a distance between the second end portion of the first frame and the display panel is larger than a distance between the display panel and the first frame surface at a middle portion of the first frame;
the first frame surface further comprises:
 a middle plane in the middle of the first frame surface;
 a first inclined surface connected to the middle plane and extending to the first end portion; and
 a second inclined surface connected to the middle plane and extending to the second end portion; and
a length of the first inclined surface in a longitudinal direction of the first frame surface is larger than a length of the middle plane, and a length of the second inclined surface in a longitudinal direction of the first frame surface is larger than the length of the middle plane.

11. The display device according to claim 10, further comprising a buffer disposed between the plastic frame and the display panel, an orthographic projection of the buffer on the display panel being not overlapped with the bonding part.

12. The display device according to claim 10, wherein the first height difference is 0.1-0.3 mm.

13. The display device according to claim 10, further comprising:

a third frame having a third frame surface, an end portion of the third frame being connected to the second end portion of the first frame;

wherein the third frame surface and the first frame surface are located on the same side of the display device, and a second height difference between the first frame surface at the second end portion of the first frame and the third frame surface is smaller than a height difference between the first frame surface at a middle portion of the first frame and the third frame surface.

14. The display device according to claim 13, wherein the second height difference is 0.1-0.3 mm.

15. The display device according to claim 13, wherein the first frame surface comprises:
a middle plane in the middle of the first frame surface;
a first inclined surface connected to the middle plane and extending to the first end portion; and
a second inclined surface connected to the middle plane and extending to the second end portion.

16. The display device according to claim 15, wherein:
an inclination angle of the first inclined surface with respect to the middle plane is 5°-10°; or
an inclination angle of the second inclined surface with respect to the middle plane is 5°-10°.

17. The display device of claim 16, wherein:
a height of the first inclined surface at the first end portion is greater than a height of the second frame surface; or
a height of the second inclined surface at the second end portion is greater than a height of the third frame surface.

18. The display device according to claim 15, wherein:
the length of the first inclined surface is 10-20 mm; or
the length of the second inclined surface is 10-20 mm.

* * * * *